United States Patent

Burgis et al.

[15] 3,650,376

[45] Mar. 21, 1972

[54] ACCUMULATING CONVEYOR

[72] Inventors: William J. Burgis, Park Ridge; Marvin H. Coleman, Winnetka, both of Ill.

[73] Assignee: Conveyor Systems, Inc., Morton Grove, Ill.

[22] Filed: Aug. 17, 1970

[21] Appl. No.: 64,202

[52] U.S. Cl. ............................................. 198/129, 198/160
[51] Int. Cl. ......................................................... B65g 15/30
[58] Field of Search ........................ 198/160, 127, 135, 129

[56] References Cited

UNITED STATES PATENTS

| 3,545,596 | 12/1970 | Turnbough | 198/160 X |
| 2,253,198 | 8/1941 | Regan | 198/135 X |
| 3,047,127 | 7/1962 | McGow | 198/160 |

*Primary Examiner*—Joseph Wegbreit
*Assistant Examiner*—Hadd S. Lane
*Attorney*—Wallenstein, Spangenberg, Hattis & Strampel

[57] ABSTRACT

An accumulating conveyor having laterally spaced roller means for supporting articles for movement along a conveying path and means for stopping articles on the conveyor where desired. The articles are most advantageously impelled along the laterally spaced roller means by one or more longitudinally spaced projecting portions preferably on a continuous belt whose upper section moves in the space between the laterally spaced roller means. EAch projecting portion of the belt rises slightly above a plane tangent to the top of the roller means and has an upwardly and rearwardly inclining leading edge portion which provides a shoulder which pushes the rear of an article along the laterally spaced roller means and readily slips beneath the article when the article is held against further movement along the laterally spaced roller means.

10 Claims, 6 Drawing Figures

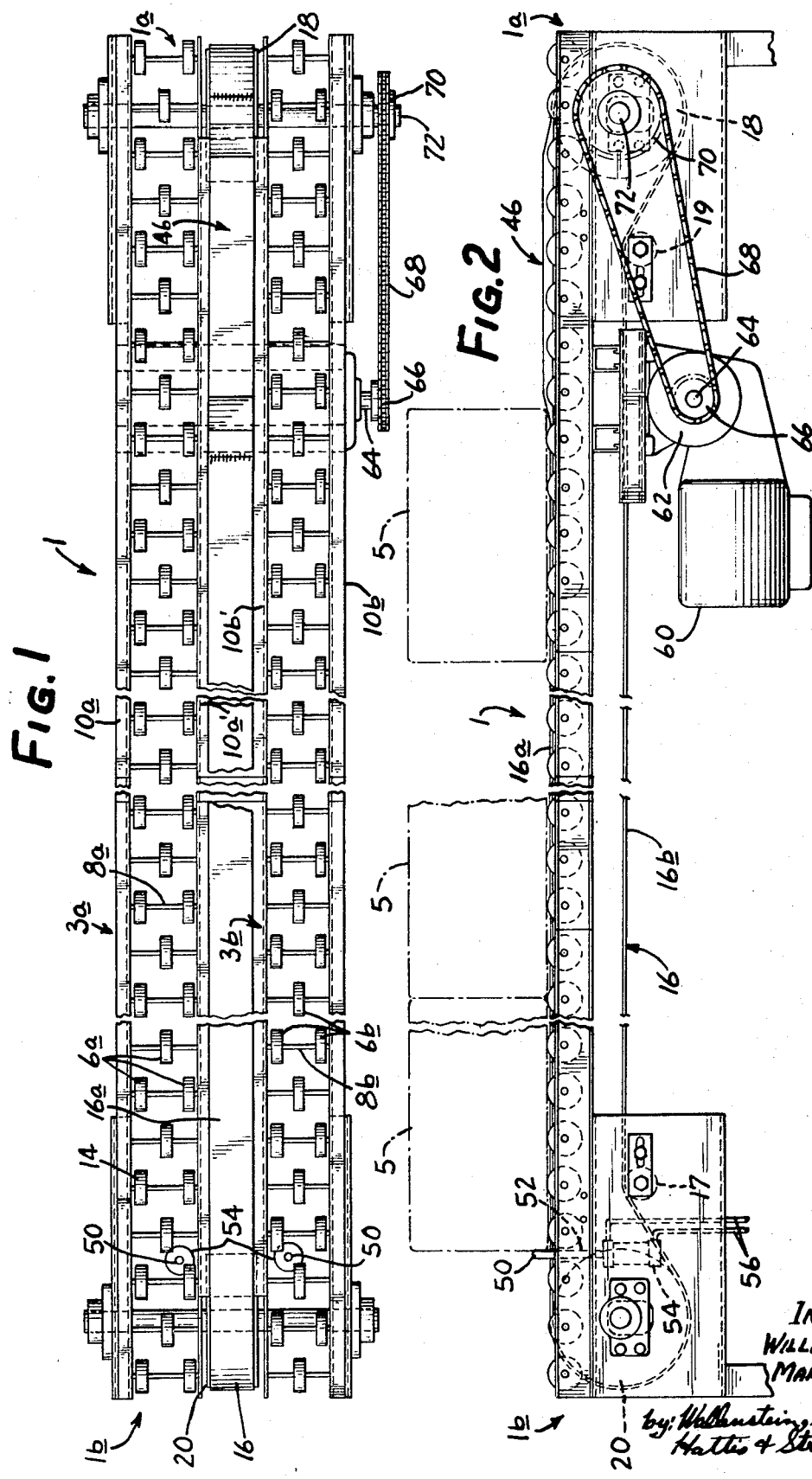

Patented March 21, 1972
3,650,376
2 Sheets-Sheet 2
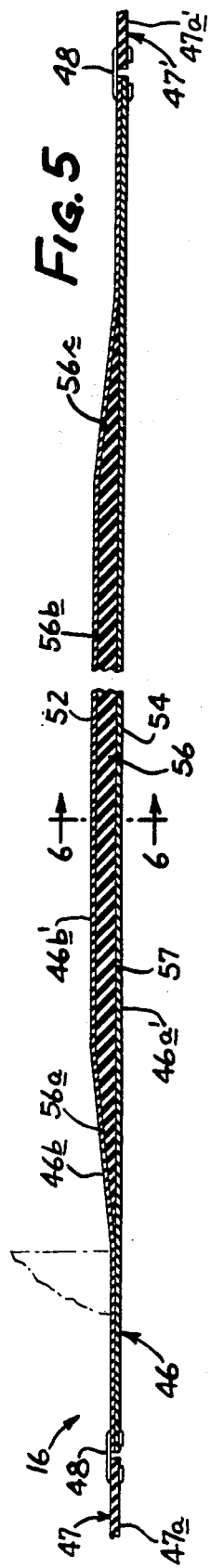
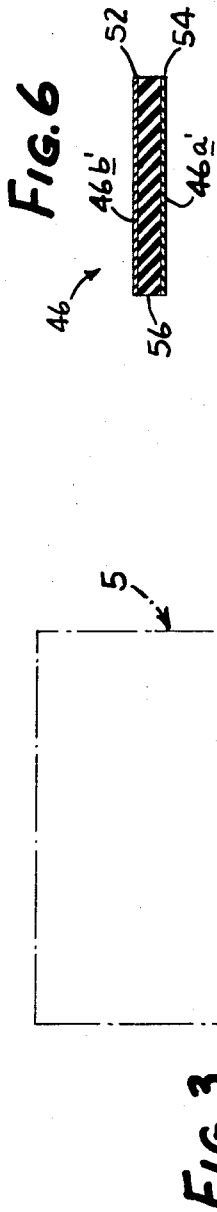
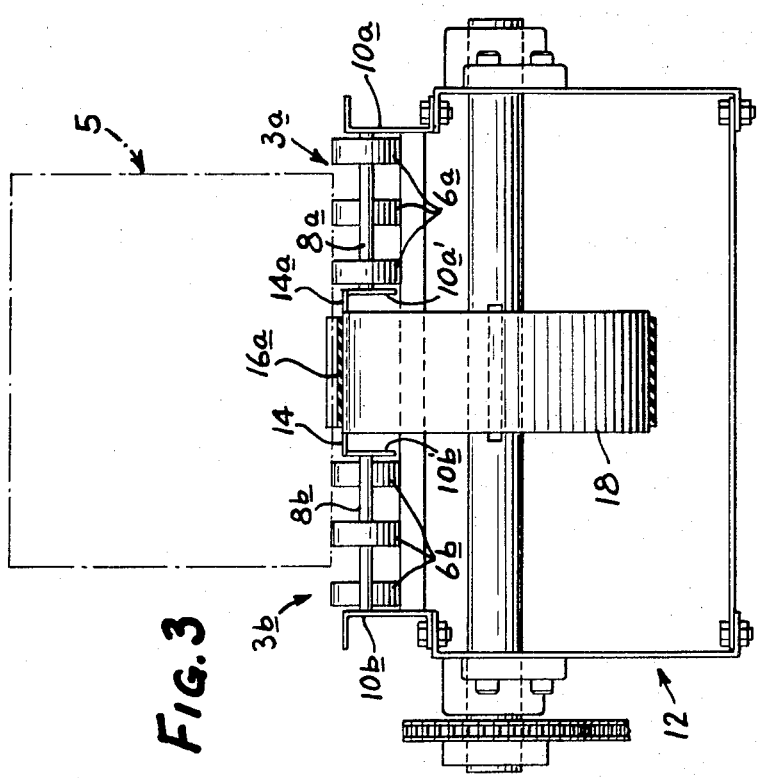
INVENTORS
WILLIAM J. BURGIS
MARVIN H. COLEMAN
by: Wallenstein, Spangenberg, Hattis
  + Strampel          ATTYS.

ACCUMULATING CONVEYOR

This invention relates to accumulating conveyors, that is conveyors wherein articles which are normally positioned in longitudinally spaced relation on the conveyors reach a point thereon where it is desirable temporarily to stop the movement of the articles by raising a gate or stop pin means in the path of movement of an article causing the articles behind the same to accumulate one immediately behind the other, until the articles are again permitted to move along the conveyor.

When article accumulation occurs in this manner, the appreciable article-damaging back pressures can build up with the the accumulating conveyors of the type heretofore developed unless the force which conveyed the articles along the conveyor is terminated. Various means have been utilized for automatically terminating the force which impels the articles along the conveyor when article accumulation occurs. For example, one such method is disclosed in U.S. Pat. No. 3,122,232 which utilizes article sensing elements positioned along the conveyor at the front ends of longitudinally spaced sections of the conveyor each having a length equal to about one article length. Each of the article sensing elements are designed to control the drive of the rollers on the conveyor section immediately behind the one in front of which each sensing element is positioned. Thus, when the first or lead article on the conveyor is held against movement as it is over the first article sensing element, the driving force on the conveyor section behind the section where the sensing element is located is terminated until the article leaves the first sensing element involved. In such case, there is no back pressure exerted by one article on the other when the articles come to rest one behind the other due to the coasting of the articles on the conveyor. Also, the articles are automatically spaced a given fixed distance apart since an article behind another article permitted to move forward will not move until the latter article moves completely off the sensing element over which it came to rest. The disadvantage of this accumulating conveyor is that it is costly to manufacture.

The present invention deals with a very simple and inexpensive means for accomplishing the same function as the sectionalized accumulating conveyor disclosed in the aforesaid U.S. Pat. No. 3,122,232 where a small back pressure on the articles can be tolerated.

The present invention provides a unique combination of a pair of article support, means most advantageously a pair of laterally spaced roller conveyors, and article pushing means constructed to provide a low profile tapered shoulder moving in the space between the laterally spaced support means where it provides sufficient force to push an article along the laterally spaced support means until movement of the article is obstructed, whereupon the article impelling means readily slips beneath the article. The laterally spaced support means are most advantageously roller conveyors, such as skate wheel conveyors each of a type commonly used as gravity operated conveyors where the conveyor inclines downwardly toward the discharge end thereof. In the invention, the conveyors are oriented so an external force is needed to convey articles thereon and they are laterally spaced apart to support the opposite side marginal portions of an article centered over the space between the conveyors. The article impelling means most advantageously have a relatively wide, slightly outwardly and rearwardly inclined, low friction leading edge portion of a projecting section of a belt or the like. Since only a small force is required to move an article over the laterally spaced rolled conveyors, even a slightly inclined shoulder made of a low coefficient of friction material is effective to impel an article along the roller conveyors, and such a shoulder will readily slip beneath an article held against forward movement, thereby minimizing any forces applied to the article involved.

In the most preferred form of the invention where the article impelling means is a projecting portion of a belt, the belt may generally comprise an outer relatively thin layer of relatively low friction material and an inner relatively thin layer of a relatively high friction material laminated to the outer layer where the inner layer is to be driven by a rotating drum or the like. In those sections of the belt where it is desired to form an article impelling means, a core of a relatively thick rubberlike material having a tapered leading edge portion is sandwiched between the inner and outer layers of the section of the belt involved. The core of material, which may be initially an unvulcanized rubber, is vulcanized under heat and pressure to the surfaces of the outer and inner layers to form a strong durable laminated belt section.

The above and other features and advantages of the invention will become apparent upon making reference to the specification to follow, the claims and drawings wherein:

FIG. 1 is a plan view of one section of a conveyor which incorporates features of the present invention at which section articles can be accumulated;

FIG. 2 is a side elevational view of the conveyor section shown in FIG. 1;

FIG. 3 is an end view of the section of the conveyor shown in FIG. 1;

FIG. 4 is a fragmentary longitudinal sectional view through the central portion of the conveyor section shown in FIGS. 1 and 2, showing means for supporting and adjusting the tension of a belt forming part of the conveyor section;

FIG. 5 is a greatly enlarged longitudinal sectional view through the section of a belt forming part of the conveyor section of FIGS. 1 and 2 which belt section impels articles along the conveyor section shown in FIG. 1; and FIG. 6 is a transverse sectional view through the belt shown in FIG. 5, taken along section line 6—6.

Referring now more particularly to FIGS. 1 through 3, the accumulating conveyor section there shown and generally indicated by reference numeral 1 forms one section of an overall conveyor system of any suitable design and which may include one or more other similar accumulating sections at points where article accumulation is desired. As illustrated, the accumulating conveyor includes a pair of laterally spaced roller conveyors 3a and 3b each having a width which is a fraction of the width of an article to be carried thereby, such as a box 5 as indicated in dashed lines in FIGS. 2 and 3. Each illustrated roller conveyor resembles in construction (but not in size or orientation) a conventional skate wheel conveyor used as a gravity operated conveyor. Each skate wheel conveyor 3a and 3b thus comprises, respectively, distributed skate wheels 6a and 6b mounted on shafts 8a and 8b extending between side frame members 10a–10a' and 10b–10b'. The skate wheel conveyor 3a and 3b are each of a size to support only part of the width of the articles to be conveyed, are laterally spaced apart and are generally horizontally orientated so as to require some external force for advancing articles therealong. Thus, the upper extremities of the various skate wheels 6a and 6b are in a common horizontal plane and the innermost margins of the conveyors 3a and 3b are spaced apart preferably a distance which is an appreciable fraction of the width of the article 5 to be conveyed. As shown in FIG. 3, the box 5 rests on the two innermost rows of skate wheels on the conveyors 3a and 3b and is centered over the space between the conveyors 3a and 3b.

As best shown in FIG. 3, the side frame members 10a–10a' and 10b–10b' form part of a common frame work generally indicated by reference numeral 12. The innermost side frame members 10a' and 10b' are shown interconnected by a horizontal web 14 which is positioned relatively close to the upper extremities of the conveyor skate wheels 6a and 6b. The web 14 forms a horizontal support 14a for the upper section 16a of a continuous belt 16 which passes around a belt driving drum 18 at the inlet end 1b of the accumulating conveyor section 1 and an idling drum 20 at the discharge end 1a of the accumulating conveyor section 1. The web 14 terminates just short of the centers of the drums 18 and 20.

The belt 16 has a lower belt section 16b which passes around various guide rollers 17, 19, etc. (see FIG. 2) positioned adjacent the drums 18 and 20. At approximately the midpoint of the lower section 16b of the belt 16, a belt tension adjusting means 21 may be provided as illustrated in FIG. 4.

The belt tension adjusting means includes horizontally spaced guide rollers 29 and 31 below and between which is located a pressure applying roller 33 carried on the end of an arm 35 pivotally supported about a pivot axis 37. The belt 16 passes over the roller 29, under the roller 33 and then over the roller 31. The arm 35 has attached thereto a bracket 39 through which passes an adjusting screw 41 which threads through a pair of nuts 43—43 positioned on opposite sides of a horizontally extending wall 44 forming part of the bracket 39. The end of the screw 41 bears against a stationary wall 45 so that adjustment of the screw 41 varies the angle of the arm 35 and therefore the pressure applied by the guide roller 33 on the upper surface of the lower section 16b of the belt 16.

The belt 16 has a width which occupies most of the space between the conveyor 3a and 3b. For most of the length thereof, the belt 16 has a consistent relatively thin cross section. The belt 16 has one or more outwardly projecting belt sections 46 connected as by belt lacing 48 to adjacent thin belt sections 47–47'. Each outwardly projecting belt section 46 (the belt 16 as illustrated has only one outwardly projecting belt section) constitutes a means for impelling articles supported on the conveyors 3a and 3b. The bottom surface 46a' of the belt section 46 forms a continuously coplanar extension of the bottom surfaces 47a–47a' of the adjacent sections 47–47' of the belt, as best shown in FIG. 5. The outermost surface of the article impelling belt section 46, however, has preferably extending across the full width thereof an outwardly and rearwardly inclining leading edge portion 46b forming a sharply angled or pointed edge portion which joins a flat outer belt portion 46b'.

Except for the outwardly projecting belt section 46, the outer surfaces of the belt 16 are at an elevation below the upper extremities of the conveyor skate wheels 6a and 6b. The flat outer portion 46b' of the outwardly projecting belt section 46 extends to an elevation slightly above the upper extremities of the conveyor skate wheels 6a and 6b. The inclined leading edge portion 46b of the outwardly projecting belt section 46 preferably forms a shoulder of appreciable width which engages the rear corner or an article 5 and pushes the same along easily rotatable skate wheels 6a and 6b as long as the article involved is free to move.

The accumulating conveyor section 1 has adjacent the discharge end 1b thereof article stop means, such as a pair of vertical stop pins 50—50 (FIGS. 1 and 2) secured to respective piston rods 52—52 extending from hydraulic cylinders 54—54. The stop pins 50—50 are normally retracted below the level of the upper extremities of the skate wheels 6a and 6b. When article accumulation is desired, the hydraulic cylinder 54 has pressure applied thereto through hydraulic pressure lines 56 to raise the pins 50—50 above the level of the skate wheels 6a and 6b to stop movement of the articles 5. When this occurs, the outwardly and rearwardly inclining leading edge portion 46b of the outer surface of the projecting belt section 46 readily slips beneath the article 5 which it engages, thereby to apply a minimum of back pressure against that article and the article in front of the same.

Although the article impelling means could less desirably constitute means other than a projecting portion of a belt, when it is so constituted it most preferably comprising a relatively thin outer layer 52 of a relatively low coefficient of friction material of the same thickness throughout, a relatively thin inner layer 54 of a relatively high coefficient of friction material of the same thickness throughout and a relatively thick intermediate layer or core 56 of a resilient and flexible material like rubber which has the same general contour as the desired cross sectional shape of the outwardly projecting belt section 46. Accordingly, the core 56 has the slightly outwardly and rearwardly inclining leading edge portion 56a extending the full width of the belt, which leading edge portion joins a flat portion 56b which, in turn, terminates in a rearwardly and inwardly inclining trailing edge portion 56c. The inner surface 57 of the core 56 is flat along its entire length. The confronting surfaces of the outer and inner layers 52 and 54 of the outwardly projecting belt section 46 and the core 56 are adhesively secured together over substantially their entire extent, that is, there is no relative sliding movement possible between the core 56 and the outer and inner layers 52 and 54.

The outer layer 52 of the outwardly projecting belt section 46 may be made of a cotton-nylon fabric, and the inner layer 54 thereof may be made of a cotton-rubber fabric. The core 56 may be Buna-N rubber initially in an uncured state. In such case, the outer and inner layers 52 and 54 and the core 56 therebetween may be securely laminated by pressing the same together at a rubber vulcanizing temperature where the rubber initially flows within the small recesses of the outer and inner layers 52 and 54, thereby to form an intimate bond between the core 56 and the outer and inner layer 52 and 54. Since the inner layer 54 is made of a high coefficient friction material, the drum 18 can readily impart a driving force to the belt 16, and the resiliency and flexibility of the core 56 enables this portion of the belt readily to pass around the various drums and rollers referred to.

As shown in FIG. 2, the drum 18 may be driven from an electric motor 60 which includes a speed reducer 62 having an output shaft 64 carrying a sprocket 66 around which passes a chain 68 or the like. The chain 68 passes around another sprocket 70 secured to a shaft 72 carrying the drum 18.

The present invention thus provides an exceedingly simple, inexpensive and effective accumulating conveyor with a minimum of back pressure applied to the articles. It should be understood that numerous modifications may be made to the most preferred form of the invention described above without deviating from the broader aspects of the invention.

We claim:

1. An accumulating conveyor comprising laterally spaced article support means having upper article engaging surfaces for supporting the opposite side marginal portions of an articles and positioned along a conveying path in a direction where gravity is inoperative to impel an article thereon, article stopping means located at a point adjacent to said path and selectively movable into and out of the path of movement of an article on said laterally spaced article support means, the articles accumulating one behind the other when the article stopping means is moved into the path of said articles, respective article impelling means longitudinally spaced a distance greater than the length of the articles to be impelled thereby the conveyor being devoid of article impelling means therebetween, the leading portion of each of said article impelling means rising above the plane of the article engaging surfaces of said laterally spaced article support means and inclining upwardly and rearwardly from points at or adjacent to the plane of said surfaces to provide an inclined article pushing shoulder which normally engages the central portion of the rear end of an article to push the same along said support means when the article is free to move along said path and having an upper surface of relatively low friction material which readily slips beneath the article when the article is held against such movement so the impelling means moves past the article, and means for repeatedly moving said longitudinally spaced article impelling means between said laterally spaced article support means along said conveying path in said direction.

2. The accumulating conveyor of claim 1 wherein said upwardly and rearwardly inclining leading edge portion of said article impelling means has an outer low friction surface.

3. The accumulating conveyor of claim 2 wherein said upwardly and rearwardly inclining leading portion of each of said article impelling means makes a very small angle with the article support plane of said laterally spaced article support means which engages and supports the articles, said laterally spaced article support means being roller means which offers little resistance to the movement of an article thereover.

4. The accumulating conveyor of claim 1 wherein said means for moving said article impelling means is a continuously driven belt whose upper section moves in the space between said laterally spaced article support means, the belt including portions located at or below the article support plane of said laterally spaced article support means and longitudinally spaced portions of the belt carrying said article impelling means which merge with said former belt portions and project above said support plane when the portion of the belt involved becomes part of the upper section of the belt, and there is further provided belt support means extending between said laterally spaced article support means for supporting the upper section of the belt in position where said article impelling means can impel an article on said laterally spaced article support means.

5. The accumulating conveyor of claim 4 wherein said leading portion of each of said article impelling means which engages and pushes an article extends substantially for the full width of the belt.

6. The accumulating conveyor of claim 5 wherein each of said article impelling means are formed by an outwardly thickened portions of the belt.

7. The accumulating conveyor of claim 6 wherein each thickened portion of the belt is formed by laminated layers including an outer layer of material of about the same thickness throughout a single intermediate layer which has a varying cross section to thicken the belt and form said inclined leading portion of the article impelling means, and an inner layer of about the same thickness throughout.

8. The accumulating conveyor of claim 7 wherein said inner layer of said belt is made of a relatively high coefficient of friction material.

9. The accumulating conveyor of claim 7 wherein said inner and outer layers are relatively thin layers and said intermediate layer is a relatively thick layer made of a rubberlike material.

10. The accumulating conveyor of claim 7 wherein said inner layer is an initially unvulcanized rubber which has been vulcanized under heat and pressure adhesively to secure the same over substantially all confronting surfaces of said inner and outer intermediate layers.

* * * * *